United States Patent [19]

Müeller

[11] 4,187,438
[45] Feb. 5, 1980

[54] CIRCUIT ARRANGEMENT FOR UNILATERALLY SCANNING DISTORTED TELETYPE CHARACTERS

[75] Inventor: Werner Müeller, Munich, Fed. Rep. of Germany

[73] Assignee: Siemens Aktiengesellschaft, Berlin & Munich, Fed. Rep. of Germany

[21] Appl. No.: 857,283

[22] Filed: Dec. 5, 1977

[30] Foreign Application Priority Data

Dec. 3, 1976 [DE] Fed. Rep. of Germany ....... 2654927

[51] Int. Cl.² ............................................. H03K 5/04
[52] U.S. Cl. ................................... 307/268; 178/63 E; 178/69 A; 307/354; 307/362; 328/146; 328/162
[58] Field of Search ....................... 307/268, 354, 362; 328/146, 162, 164; 178/63 E, 69 R, 69 A

[56] References Cited

U.S. PATENT DOCUMENTS

| | | | |
|---|---|---|---|
| 3,742,473 | 6/1973 | Hadden | 307/362 X |
| 3,794,775 | 2/1974 | Hick et al. | 328/164 X |

Primary Examiner—John Zazworsky
Attorney, Agent, or Firm—Hill, Van Santen, Steadman, Chiara & Simpson

[57] ABSTRACT

A circuit for unilaterally scanning teletype characters wherein the characters are supplied to an integrating circuit and to an impulse circuit wherein the impulse circuit can be controlled by the step changes of a character. A comparator circuit receives the output of the integration circuit and assumes a definite condition with each step change through a switch which is controlled by the impulses of the impulse circuit and a reference signal is supplied to the comparator circuit and the reference signal can be adjusted according to the desired delay of the descending or ascending edge of the step changes in the characters.

7 Claims, 4 Drawing Figures

CIRCUIT ARRANGEMENT FOR UNILATERALLY SCANNING DISTORTED TELETYPE CHARACTERS

BACKGROUND OF THE INVENTION

1. Field of the Invention

This invention relates in general to a circuit for correcting distorted teletype characters.

2. Description of the Prior Art

It is known in systems for correcting distorted teletype characters to release a scanning process for the duration of a character by means of a start signal which precedes each character. Scanning pulses are thereby produced in chronological order depending upon the start signal which respectively scan the individual step changes of the character in the stage center. This allows the reversals and phase shifts to be obtained even in chronologically displaced signals and, thus, the individual step in distortedly arriving characters are respectively scanned such that the correct polarity of the step is determined with a high probability. The term reception latitude has been introduced which defines the largest distortion for which a receiver will barely be capable of reproducing all characters correctly. The theoretically obtainable reception latitude for Teletype characters is 50%. For the setting of the scanning pulse, a so-called reception setter is utilized which is known that allows displacement of the scanning points in time to be accurately set. Thereby, it is possible to recognize unilateral distortions which considerably exceed the permitted proportion rate and to compensate so that in those cases it is also possible to obtain perfect reception of the characters. In conventional Teletype apparatus, the reception setter is a component part of the Teletype machine. Newer Teletype equipment which operate with a sufficiently large reception latitude do not contain reception setters in the machines. However, particularly during single current transmission over lines having great lengths considerably greater distortions occur and it is necessary to provide an arrangement which corresponds in its operation to the reception setter which can be utilized by the user of the Teletype apparatus when required.

SUMMARY OF THE INVENTION

It is an object of the present invention, therefore, to provide a circuit arrangement for unilaterally scanning distorted Teletype characters which provides considerable savings as compared to the prior art equipment which were part of the Teletype apparatus.

The invention has the primary objective to provide an arrangement with which it is possible to receive Teletype characters having a substantial unilateral distortion and to correctly reproduce Teletype characters without the use of gearing arrangements which are connected to the Teletype apparatus and without displacing the scanning points in time.

An essential characteristic of the inventive arrangement allows both edges of the step changes within a character to be displaced instead of displacing the scanning points of time. The switching steps required therefore are considerably less expensive than the ones for the scanning pulse displacement. Such a switching circuit, however, can primarily be employed and connected into the existing circuits of the Teletype apparatus without the use of gearing for example and it can be assigned to the circuits of the connection technique.

The invention employs a comparator which evaluates a reference signal and also permits a selective setting of the side displacement not only for increasing but also for decreasing edges of the Teletype characters. It is advantageous to correctly receive characters with both lagging and leading distortions. A potentiometer is used in order to generate the reference signal in the invention. Thus, not only the switching design is simplified but moreover a continuous setting of the reference signal and, thus, a continuous displacement of the edges of the step changes is accomplished with great precision in these settings. The invention utilizes integrated circuits and not only controls not only the descending but also the ascending edges of the step changes and, thus, the same time determining components can be utilized for both of the two displacements and a great symmetry of the edge displacement is assured.

Further, objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
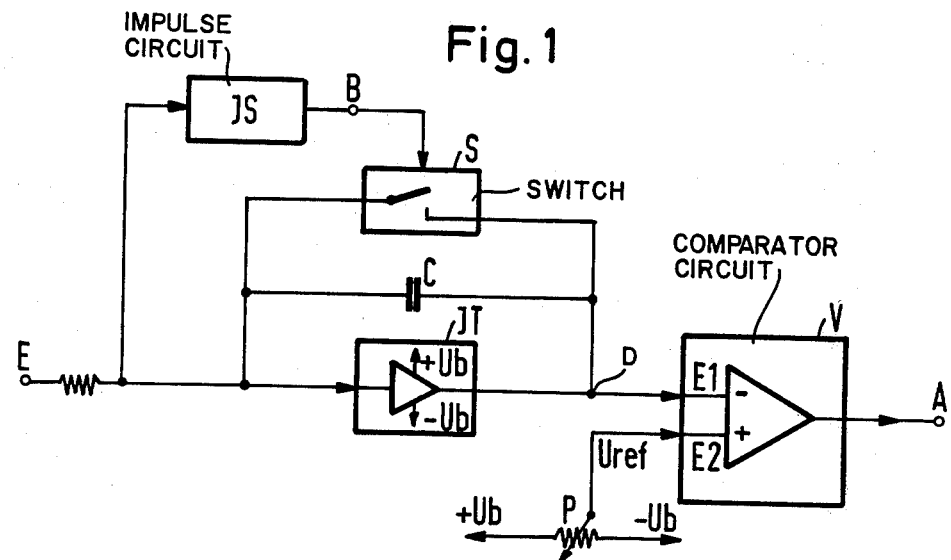
FIG. 1 is a schematic diagram of a sample embodiment of the invention in block diagram form.

FIG. 1 illustrates an input terminal E which supplies a signal through an impedance to the input of an impulse circuit IS and also to the input of an integration circuit IT. The output terminal of the impulse circuit is connected to terminal B and this output is connected to the operating terminal of a switch S which is connected in parallel with a capacitor C. The capacitor C and the switch S are also connected between the input and output of the integration circuit IT. The impulse circuit IS produces with each step change within a character at its output B, a short output impulse which actuates the switch S. The switch S illustrated in FIG. 1 is illustrated as a simple two pole switch, however, it will be realized that an electronic switch would be utilized in a practical embodiment. The capacitor C which is connected in parallel with the integration circuit IT is discharged when the switch S is closed which provides a definition of a condition which is set at the beginning of a step at the output of the integration circuit IT. The output D of the integration circuit IT is connected to an input terminal E1 of a comparator circuit V which also receives at its second input terminal E2 a reference signal Uref. The reference signal Uref is produced with a potentiometer P which can be adjusted between a maximum value of $+Ub$ and $-Ub$ and thus the potentiometer can produce an output which varies between a positive and a negative maximum value.

The output signal at the output A of the comparator circuit V will always be switched when the voltage produced by the integration circuit which is connected to the input E1 of the comparator circuit corresponds to the reference voltage Uref which has been set by the potentiometer. Switching back occurs with the resetting of the integration circuit IT. The decision whether the comparator circuit produces an output impulse at the ascending or at the descending edge of the step change can be set by means of the selection of the polarity of the reference signal Uref. Since the reference signal can be continuously adjusted between the maximum and minimum values by the use of the potentiometer P a continuous maximum displacement of either the ascending or the descending edge of the step change can be accomplished. Only one time determining element is required in the circuit and there will be no time differences between the ascending and descending edges when a step change results. Thus, the setting precision essentially depends upon the linearity of the device which produces the reference signal which in the example of FIG. 1 comprises the potentiometer P and the linearity of this device can be very accurate.

Figure 2:
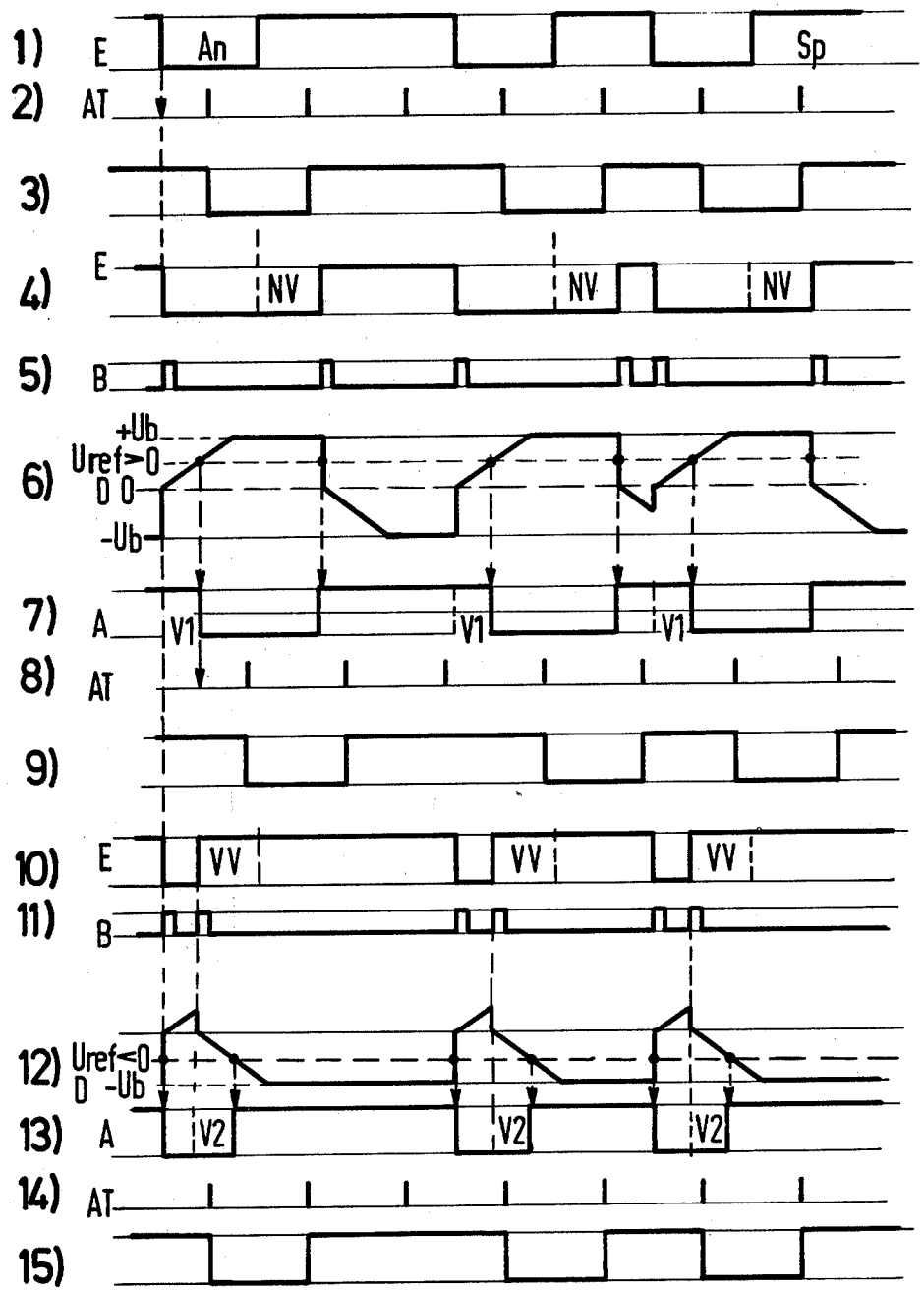
FIG. 2 illustrates the wave shapes occurring as a function of time at various points in the invention.

FIG. 2 illustrates wave forms existing in the invention and is used for an illustration to explain the invention. Lines (1), (2) and (3) in FIG. 2 illustrate the reception of a non-distorted character comprising in the example of a start signal An, 5 character steps and a stop step Sp. As soon as the start signal appears, the scanning pulse AT line (2) is switched on which causes the character to be scanned in the step center. Thus, the received character is available by half a stage length delay, line (3).

As illustrated in lines (4) through (9), the reception of a character line (4) arriving with a lagging distortion NV will be explained in the inventive arrangement. The impulse circuit IS produces an output impulse at its output B illustrated at line (5) with each step change of the character and the output impulse actuates the switch S temporarily for a short time. This causes the output of the integration circuit IT which operates between the two potentials +Ub and −Ub to be set to the value of 0 at the beginning of each step. Proceeding from this value, the voltage at the output D of the integrator IT rises to the value +Ub or drops to the value of −Ub as illustrated in line (6). The signal at the output D of the integration circuit IT is supplied to the input E1 of the comparator circuit V which receives at its second input E2 the reference voltage Uref. The reference voltage is set to a value between 0 and +Ub in case of a lagging distortion (Uref>0). If the value connected to the input E1 reaches the value of the reference signal Uref set at the input E2, the output signal at the output A of the comparator circuit will be switched. In this example, it respectively happens after delay time of v1 so that the output impulse A is produced in a delayed manner as shown in line (7) relative to a descending edge of a step change. As the scanning signal AT is also switched on with the output of the impulse of the comparator circuit V which was effected by the start signal of a character and said scanning pulse AT respectively scans the pulses which are produced at the output A of the comparator circuit V in the step centers, the distorted character will be passed further on through the system in an undistorted manner as illustrated in line (9) shown in FIG. 2.

If a character with a leading distortion VV appears at the input E as illustrated in line (10) of FIG. 2, an impulse will be produced as shown in line (11) of FIG. 2 by way of the impulse circuit IS with each step change of the character and the output of the integration circuit IT will be set to 0 as illustrated in line (12) in FIG. 2 by means of the discharging of the capacitor C at the beginning of each step change. After each step change, the voltage of the output D of the integration circuit IT will start to rise or to drop as shown in line (12) of FIG. 2 depending upon the polarity of the step. In the example, which assumes that the characters having a leading distortion are occurring, the reference signal Uref at the second input of the comparator circuit V will be set to a negative value (Uref>0). This leads to the result that at the output A of the comparator circuit V the switching caused by an ascending edge of a step change appears delayed by a duration of v2 relative to the ascending edge of the step change at the input E whereas the switching which occurs by the descending edge of a step change is accomplished in the time correct relationship as illustrated in line (13) of FIG. 2. As the interrogation pulse AT will again be switched on at the output A of the comparator circuit V due to the step change which introduces the start signal with the released switching illustrated in line (14) of FIG. 2, the interrogation pulse which causes the output signals of the comparator V to be scanned will produce non-distorted signals at the output as shown in line (15) of FIG. 2.

Figure 3:
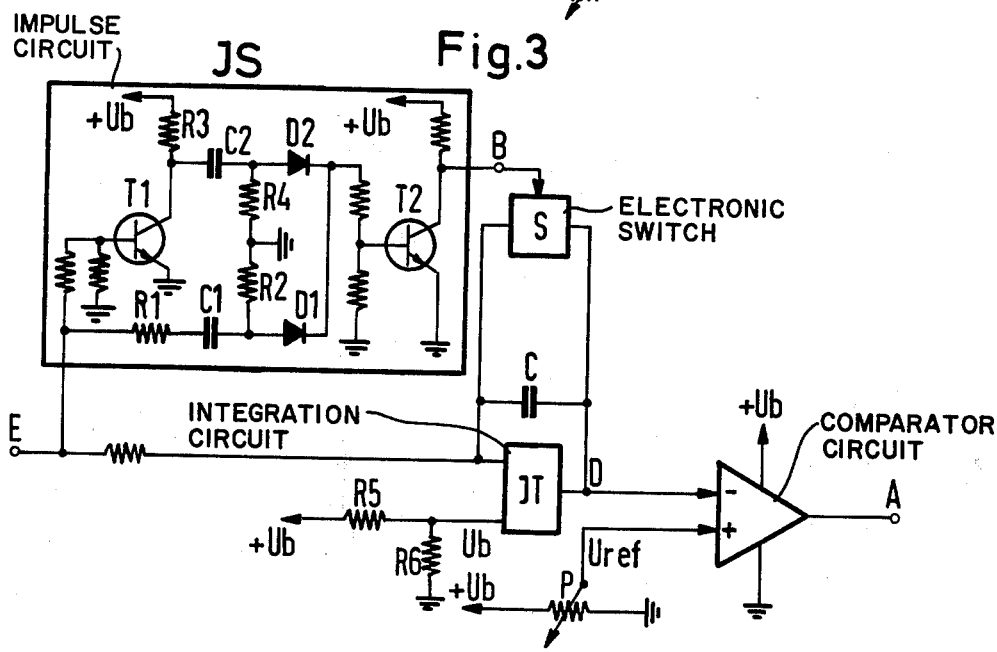
FIG. 3 is an electrical schematic view of a sample embodiment of the invention.

FIG. 3 is a circuit diagram of a sample embodiment of the invention illustrating the impulse circuit IS as including two transistors T1 and T2 and also two differentiating circuits comprising respectively the resistor R1 and capacitor C1 and the resistor R2 or R3 with capacitor C2 and resistor R4. The input terminal E is coupled to the base of transistor T1 which has its emitter connected to ground and its collector connected to a resistor R3 which has its other side connected to a suitable biasing source Ub. A capacitor C2 is connected from the collector of transistor T1 to a diode D2 and through a resistor to the base of a transistor T2. A resistor R4 is connected between the junction point of the capacitor C2 and the diode D2 and ground. A resistor R1 is connected from the input terminal E to a capacitor C1 which has its other side connected to a diode D1 which is connected to the junction point between the diode D2 and the resistor connected to the base of transistor T2. A resistor R2 is connected between the junction point between the diode D1 and the capacitor C1 and ground.

The emitter of transistor T2 is connected to ground and the collector is connected to the output terminal B of the impulse stage IS and is supplied to the switch S. Each polarity change, in other words each step change of a character appearing at the input E is directly differentiated by the circuit R1, C1 and R2. The input signal is also inverted through the transistor T1 and then differentiated by the capacitor C2 and the resistors R3 and R4. The positive going portion of the step changes are respectively selected with the two diodes D1 and D2 and are supplied to the switch S at the output B of the impulse circuit IS. The switch S is a potential free electronic switch which has the same low resistance in both directions. The switch S can be a so-called transmission gate which can switch voltages through ±7.5 volts relative to a virtual zero point of the integration circuit IT. The capacitor C is utilized as a time determining member for the integration circuit IT and the capacitor C has a tolerance which essentially determines the precision of the reception setter. It is advantageous to determine a value as a reference potential UB for the integration circuit IT which is equal to one half of the operating voltage ±Ub. This can be accomplished as illustrated in FIG. 3 by the use of a divider circuit comprising the resistors R5 and R6 connected to the input of the integration circuit IT. This allows only a unipolar voltage to be required at the input E.

Figure 4:
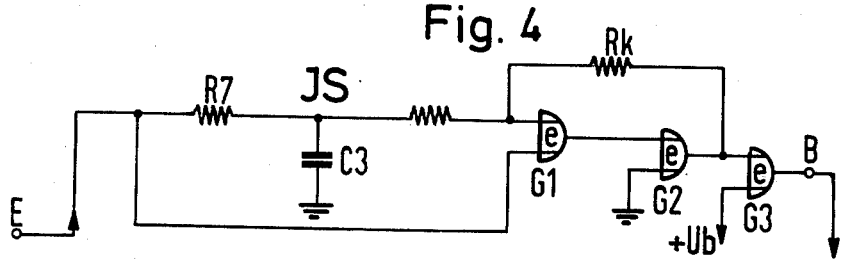
FIG. 4 illustrates a modification of the invention.

In FIG. 4, an impulse circuit IS constructed as an integrated circuit with a RC member connected in series is illustrated. The signal arriving at input terminal E is supplied directly to the input of a first exclusive OR gate G1 and then is delayed through a second path through the resistor R7 and the capacitor C3 to the other input of the gate G1. As long as both of the inputs have the same potential, the output of the first exclusive OR gate G1 will remain at 0. If a step change occurs the potential at the undelayed input of the first gate G1 will be altered more rapidly than the delayed input which passes through resistor R7. This causes a high potential to appear at the output of the gate G1 for a time until the switching threshold is also exceeded at the delayed input. So as to eliminate the influences caused by the different switching thresholds and transfer characteristics of the components utilized, second and third gates G2 and G3 can be used as illustrated in FIG. 4. The second gate G2 includes back coupling resistance Rk which extends from the delayed input of gate G1 and the output of the gate G2. The second input of gate G2 is connected to ground. The third gate G3 is connected between the second gate G2 and the output B of the impulse circuit IS and is used for decoupling and/or for the setting of the polarity, for example, for inverting the signal at the output B. The signal +Ub is connected to one input of the gate G3 and the output of the gate G2 is connected to the other input of the gate G3.

Although the invention has been described with respect to preferred embodiments, it is not to be so limited, as changes and modifications may be made which are within the full intended scope as defined by the appended claims.

I claim as my invention:

1. A circuit arrangement for unilaterally scanning distorted Teletype characters, wherein the characters are supplied to the inputs of an impulse circuit (IS) which can be controlled by step changes of a character and to an integration circuit (IT), a comparator (V) with a first input (E1) connected to the output of said integration circuit (IT) and which assumes a definite condition with each step change, a switch (S) controlled by the impulses of the impulse circuit (IS) connected in parallel with said integration circuit, a reference signal source (Uref) connected to a second input (E2) of said comparator circuit (V), and said reference signal source adjustable as a function of the desired time delay of the descending or ascending edges of the step changes.

2. A circuit arrangement according to claim 1, wherein said reference signal source (Uref) is set to a positive voltage value (Uref>0) in order to scan Teletype characters with a lagging distortion (NV), and wherein the output signal (A) of the comparator circuit (V) is delayed relative to the descending edges of the step changes.

3. A circuit arrangement according to claim 1, wherein said reference signal source (Uref) is set to a negative value (Uref<0) in order to scan Teletype charcters with leading distortion (VV), and wherein the output signal (A) of the comparator circuit (V) is delayed relative to the ascending edges of the step changes.

4. A circuit arrangement according to claim 1 wherein a potentiometer (P) can be set between a minimum negative value (−Ub) and a maximum positive value (+Ub) and comprises the reference signal source (Uref).

5. A circuit arrangement according to claim 1 wherein said impulse circuit (IS) contains a first differential circuit (R1, R2, C1) directly connected to the character input terminal (E) and a second differential circuit (R3, R4, C2) connected to the character input terminal (E) through an inverting device (T1) and also contains an output switch (T2) which can be controlled by diodes (D1, D2).

6. A circuit arrangement according to claim 1, wherein said impulse circuit (IS) is constructed of at least one exclusive OR-Gate (G1), which has a first input terminal directly connected to the character input terminal (E), and which has a second input terminal connected to the character input terminal (E) through a delay device (R7, C3).

7. A circuit arrangement according to claim 1, wherein a reference potential source (UB) for the integration circuit (IT) can be adjusted to center an operating voltage (±Ub) with a pair of resistors (R5 and R6).

* * * * *